MULTICHANNEL PULSE MODULATION COMMUNICATION DEVICE

Filed Nov. 29, 1963 4 Sheets-Sheet 1

INVENTOR.
RICHARD W. BRADMILLER
BY
Michael A. Sileo Jr.
ATTORNEY

MULTICHANNEL PULSE MODULATION COMMUNICATION DEVICE

Filed Nov. 29, 1963 4 Sheets-Sheet 2

INVENTOR.
RICHARD W. BRADMILLER
BY
Michael A. Sileo Jr.
ATTORNEY

July 4, 1967 R. W. BRADMILLER 3,329,774

MULTICHANNEL PULSE MODULATION COMMUNICATION DEVICE

Filed Nov. 29, 1963 4 Sheets-Sheet 3

INVENTOR.
RICHARD W. BRADMILLER
BY
Michael A. Siler Jr.
ATTORNEY

July 4, 1967 R. W. BRADMILLER 3,329,774

MULTICHANNEL PULSE MODULATION COMMUNICATION DEVICE

Filed Nov. 29, 1963 4 Sheets-Sheet 4

INVENTOR.
RICHARD W. BRADMILLER
BY
Michael A. Sileo Jr.
ATTORNEY

United States Patent Office 3,329,774

Patented July 4, 1967

3,329,774

MULTICHANNEL PULSE MODULATION COMMUNICATION DEVICE

Richard W. Bradmiller, Orange County, Fla., assignor to Martin-Marietta Corporation, Middle River, Md., a corporation of Maryland Filed Nov. 29, 1963, Ser. No. 327,013
15 Claims. (Cl. 179—15)

This invention relates to a radio frequency modulator of the pulse code modulation type which is advantageously suitable for use in RF multichannel communication systems, and more particularly to a medium power RF modulator for such PPM or PFM communication systems as RACEP (trademark), RADA, or the like, which uniquely includes independent pulse-code modulation of a wide band of carrier frequencies and provides modulation of a specially developed band shaping envelope onto each of the pulse modulated carrier frequencies so as to advantageously restrict the radiated RF spectrum yet permit multichannel transmitting capability.

In the past two decades, pulse coded communication systems have been extensively developed and used particularly in military communication and aerospace telemetering system networks. Pulse coded communication systems, however, require a relatively wide spectral distribution of radiated power primarily due to and dependent upon the rise time and duty cycle of the modulating pulses. Further, in networks of this nature it is highly desirable that the system be capable of handling a plurality of simultaneously occurring conversations or data pulse trains. It is, therefore, inherently necessary that such communication systems be capable of handling a wide band of frequencies in order to transmit a considerably large number of simutlaneous communications. From a practical standpoint the number of simultaneous communiactions that could be processed and transmitted is undesirably restricted due to the bandwidth capabilities of present day electronic components as well as the bandwidth restrictions of the FCC.

The most common technique to control the radiation spectrum within useful and permissible energies as set down by FCC regulations is to utilize a final passive filter between the output circuit of the system and its antenna. Final passive filtering is somewhat difficult to achieve in systems where the harmonics of any one carrier frequency lies within the spectral domain of any other carrier frequency. It is, therefore, necessary to incorporate one filter for each frequency used and such filtering must be accomplished prior to summation. Additionally, all stages after the passive filter must be linear in order to maintain a controlled frequency spectrum. Final passive filtering techniques are undesirably complex and consequently excessively expensive.

There are several well known techniques for providing a multi-channel communication system having a large simultaneous communication handling capability yet requiring a considerably narrow transmitting bandwidth. One such technique, for example, utilizes a train of spaced pulses as a modulating wave wherein a pulse or space in this wave signifies a unit of information. A pulse modulated carrier wave is then produced and transmitted and appropriately demodulated at the receiver wherein the orginal pulse coded modulating wave is reproduced. Although this type of pulse coded communication system is satisfactory in many respects it does not provide a large simultaneous communication handling capability since the bandwidth required for transmitting a plurality of pulse modulated carrier waves is excessively large and such systems are therefore undesirably restricted to the use of very high transmitting frequencies. Additionally, this type of communication system is highly susceptible to interference and the occurrence of random noise. Thus, the reception of side band frequencies and random noise pulses may be processed by the RF receivers of the system as an information pulse and thereby result in reproduction distortion of the transmitted information.

Many types of multi-channel communication techniques, such as frequency shift keying, have been developed but each of these prior known techniques require a considerably wide band of transmitting frequencies and are also highly susceptible to interference and random noise pulses.

An RF modulator in accordance with the present invention includes a plurality of frequency generators which generate a plurality of intermediate frequencies; e.g., 70 to 71 megacycles and a gating and modulation pulse generator which develops a plurality of time positioned information pulses. The plurality of intermediate frequencies may be respectively modulated by the information pulses in a diode switch modulator and coupled to a summation network wherein the pulse modulated intermediate frequencies are algebraically added. A frequency translator is also provided for translating the summed pulse modulated intermediate frequencies into higher carrier frequencies; e.g. 140 to 142 megacycles. A pulse shaper is also provided for shaping the information pulses into pulses having individual bandwidths considerably narrower than the bandwidth of their respective information pulses. These narrower pulses are then utilized as a shaping envelope and superimposed or modulated onto the pulse modulated high frequency carriers so as to advantageously prevent harmonics of any one of said high frequency carriers from overlapping the frequency spectrum of any other high frequency carrier so as to uniquely restrict the RF spectrum of the high frequency carriers. In this exemplary embodiment of the present invention, the plurality of information pulses are preferably redundant and delayed with respect to each other so that none of the diode switch modulators produce an output at the same time.

It is accordingly a primary object of the present invention to provide a radio frequency modulator having both wide band modulation characteristics and relatively narrow band transmitting capabilities so as to advantageously reduce the susceptibility of the system to interference and random noise.

It is another object of the present invention to provide an RF modulator which selectively restricts the RF spectral radiation of the pulse modulated high carrier frequencies.

It is yet another object of the present invention to provide an algebraic summation network which uniquely provides substantially lossless power capability and which does not undesirably load the output circuits of the generators which develop the frequencies summed by the network.

It is still another object of the present invention to provide a high frequency oscillator of the crystal controlled type which has high stability in both fundamental and harmonic modes and which provides maximum in-phase feedback between the output and input thereof so as to stabilize the oscillation of the oscillator at its resonant frequency.

It is yet another object of the present invention to provide an RF modulator of the type described which uniquely permits non-linear operation and advantageously provides relatively high CW feedthrough rejection.

These and other objects, advantages and features of the present invention will be better understood with reference to the following more detailed description and appended claims together with the drawings wherein:

FIGURE 1 depicts a block diagram of a preferred embodiment of the present invention;

FIGURE 2 sets forth exemplary waveforms at specific terminals of the block diagram of FIGS. 1 and 3;

FIGURE 3 sets forth an AC circuit equivalence of the preferred embodiment of FIGURE 1 for assisting in describing the unique electronic phenomenon involved; and FIGURES 4A and 4B set forth exemplary detailed circuitry of the preferred embodiment of FIGURE 1.

*Detailed description—FIGURES 1–2*

Figure 1:
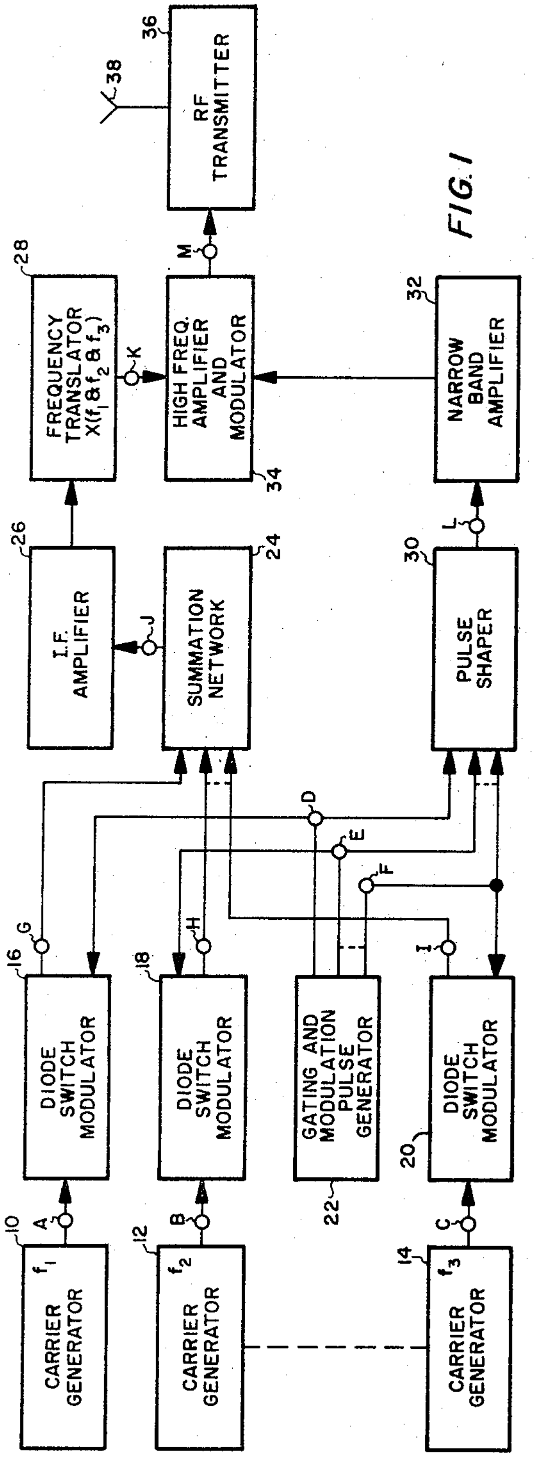
Figure 2:
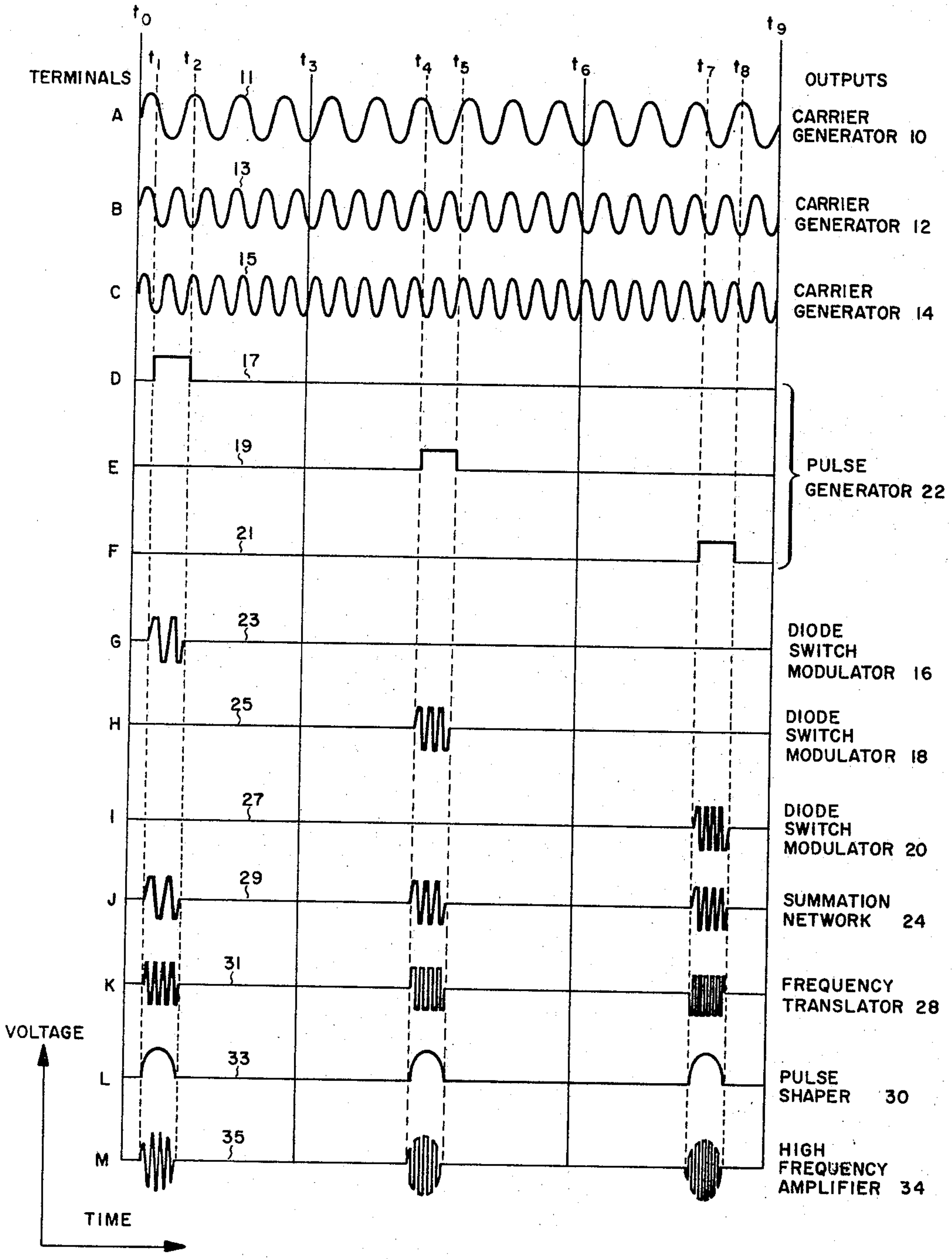

FIGURE 1 depicts a block diagram of a preferred embodiment of the multi-channel pulse modulated RF exciter of the present invention, and advantageously may be studied in conjunction with FIG. 2, which depicts a plurality of exemplary waveforms present at specified output terminals of the block diagram of FIG. 1.

A plurality of Carrier Generators 10, 12 . . . 14 are provided for independently generating a plurality of frequencies $f_1$, $f_2$ . . . $f_n$. These carrier generators are preferably of the type having a frequency stability of approximately one-tenth of a percent and having a considerably low output power, such as a few milliwatts. A number of frequencies, such as three to six, may in accordance with this invention be generated by Carrier Generators 10, 12 . . . 14, and these are graphically represented as waveforms 11, 13 . . . 15 in FIGURE 2, being respectively present on terminals A, B . . . C in FIG. 1. For exemplary purposes only, the frequency of waveforms 11, 13 . . . 15 may be 70, 70.5 . . . 71 megacycles, respectively, particularly when the present invention is utilized in communication systems of the RACEP, RACEP-TROPO and RADA type. Examples of systems of these types are set forth with particularity in co-pending application SN 107,194 filed in the name of Goode on May 2, 1961, now Patent No. 3,236,761, and co-pending application S.N. 186,912 filed in the names of Goode and Wiggins on Apr. 12, 1962, now Patent No. 3,226,644, each of these being assigned to the assignee of the present invention.

The frequencies $f_1$, $f_2$ . . . $f_n$ are respectively coupled to one input terminal of a plurality of Diode Switch Modulators 16, 18 . . . 20. Diode Switch Modulators 16, 18 . . . 20 are of the type which when closed do not undesirably load the input circuit of the subsequent stages but when open allow signals to "feed through" to the subsequent stages without undesirable loading of the previous stages so as to minimize unwanted signals from "feeding through" during non-gating intervals.

The Gating and Modulation Pulse Generator 22 is a device for generating pulses which may contain intelligence information, and in accordance with this invention, this pulse type information is to be modulated upon an RF carrier for transmission. This intelligence information may be pulse position modulation, and may involve several channels, with all but one channel typically being time delayed in different amounts with respect to the one channel, this delaying being accomplished for the purpose of providing a so-called discrete address. The intelligence may of course be voice or any other low frequency data.

The Generator 22 may involve a time-frequency matrix for providing the discrete address and be of the type used in a random access discrete address system of the type set forth in the aforementioned Goode application Ser. No. 107,194. In that instance, the three pulses appearing on lines D, E and F of the present FIG. 2 would correspond to a time frame of say 125 microseconds containing the address and redundant audio data for a particular subscriber.

As will be noted in FIG. 2, three time frames $t_0$–$t_3$, $t_3$–$t_6$ . . . $t_6$–$t_9$ are shown, with a single pulse appearing respectively on each of terminals D, E . . . F at times $t_1$ (frame $t_0$–$t_3$), $t_4$ (frame $t_3$–$t_6$) . . . $t_7$ (frame $t_6$–$t_9$).

The pulse trains 17, 19 . . . 21 are respectively coupled to the other input terminals of Diode Switch Modulators 16, 18 . . . 20. It should be noted at this point that the pulse trains 17, 19 . . . 21 are delayed with respect to each other by virtue of being address coded, so none of the Diode Switch Modulators 16, 18 . . . 20 are gated during the same time frame. For example, Diode Switch Modulator 16 is gated during time interval $t_1$–$t_2$ within time frame $t_0$–$t_3$, Diode Switch Modulator 18 is gated during time interval $t_4$–$t_5$ within time frame $t_3$–$t_6$, and Diode Switch Modulator 20 is gated during time interval $t_7$–$t_8$ within time frame $t_6$–$t_9$. As previously mentioned, the pulse waveforms 17, 19 . . . 21 may represent audio information or data information, which is to be transmitted via an RF communication link to an RF receiver remotely located, and the Diode Switch modulators 16, 18 . . . 20 are preferably of the type which do not undesirably load the summation network when no gating and modulation pulse is present on one of their input terminals. This latter feature uniquely provides substantially lossless summation of the pulse modulated RF carrier frequencies in the Summation Network 24.

Pulse code modulation of the carrier frequency $f_1$, $f_2$ . . . $f_n$ respectively takes place in Diode Switch Modulators 16, 18 . . . 20 and the pulse modulated carrier frequencies are respectively represented by waveforms 23, 25 . . . 27 in FIG. 2 and are respectively present at terminals G, H . . . I.

The pulse modulated carrier frequencies are then algebraically added in the Summation Network 24, which is of the type having a minimum power loss. The summation of the pulse modulated carrier frequencies is graphically represented as waveform 29 in FIG. 2 and appears on terminal J. Summation waveform 29 is amplified by I.F. amplifier 26, which is of conventional design, and translated into a higher frequency by Frequency Translator 28 which also is of conventional design. The output of Frequency Translator 28 is graphically represented as waveform 31 in FIG. 2 and appears at terminal K wherein it is coupled to one input of a High Frequency Amplifier and Modulator 34. For exemplary purposes only the translator 28 may be a doubler, whereby the waveform will have a frequency bandwidth between 140 and 142 megacycles.

Returning to the Gating and Modulation Pulse Generator 22, the pulse waveforms 17, 19 . . . 21 thereof are also coupled to respective input terminals of a Pulse Shaper 30. Pulse Shaper 30 generically may be an independently controlled generator of narrow bandwidth pulses, but preferably is of the type which independently shapes the wide band pulses of waveforms 17, 19 . . . 21 into pulses having relatively narrow bandwidths. The output of Pulse Shaper 30 is graphically represented as waveforms 33 and appears at terminal L. Note at this point that each pulse of waveforms 17, 19 . . . 21 are each shaped into narrow bandwidth pulses and are each coupled to the input terminal of the Narrow Band Amplifier 32. Further note that the pulse widths of the pulses of waveform 33 are respectively equal to the pulse widths of the pulses of the waveforms 17, 19 . . . 21, The desirable purpose and utility of this latter feature will be explained later.

The output of Pulse Shaper 30 is coupled to the other input of the High Frequency Amplifier and Modulator 34 via Narrow Band Amplifier 32. The narrow band pulses of waveform 33 envelope modulate the multiplied pulse coded high frequency waveform 31 as graphically shown by waveform 35 in FIGURE 2. The prime purpose for envelope modulating with relatively narrow band pulses is to advantageously exclude substantially all side band frequencies generated as a result of the "on-off" gate modulation technique utilized at the front end of the system. This uniquely eliminates any unwanted effects of any generated side band frequencies upon the center frequency of each of the generated frequencies $f_1$, $f_2$ . . . $f_n$. Additionally, although the transmission bandwidth is two megacycles (142 mc.–140 mc.) in the example shown, the narrow band envelope modulation feature advantageously restricts the bandwidth and selectively restricts the RF spectral radiation of the pulse modulated carrier frequencies.

The output of the High Frequency Amplifier and Modulator 34 is graphically represented as waveform 35 and appears at terminal M. This waveform may be conventionally coupled to the RF transmitter 36 and transmitted via antenna 38 utilizing well known transmitting techniques. The receiver of this system includes a conventional envelope and pulse demodulator. A detailed explanation of the receiver is not considered necessary for purposes of describing this invention.

Although the functions of the circuit blocks of FIG. 1 may be arranged in a different sequence than as shown without departing from the spirit and scope of the present invention, I have discovered that the exact sequence of operation as shown in FIG. 1 advantageously provides high efficiency, low cost, minimum circuit complexity, high stability and greatly simplifies manufacturing procedures. In addition to this, several ideal circuit parameters and conditions have been determined. For example, in high frequency systems, such as 100 megacycles or more, the required frequency stability of communications systems in this frequency range is generally one-tenth of a percent and accordingly necessitates the use of highly stable and easily controllable high frequency generators. I, therefore, prefer to use a modified Colpitts oscillator (see FIG. 3), which is crystal controlled and consequently provides considerably low output power due to crystal structure and activity. I have also determined that the pulse modulation of the high frequency carriers must be such that each does not undesirably affect the other during their respective gating periods nor adversely load the carrier generators during their respective non-gating periods. I therefore prefer that the unique diode switching and modulating feature of the present invention appear immediately after the carrier generators. This is so because high speed diode switches have very limited power handling capability and if employed near the rear-end of the system additional RF–CW suppression would be required. I also find it highly advantageous to pulse modulate at frequencies different from the transmitting frequencies and preferably at frequencies lower than the transmitting frequencies. This is so because the side effects and interference inherently present due to stray capacitance and magnetic effects will occur at some frequencies (e.g. 70–71 mc.) other than the frequencies transmitted (e.g. 140–142 mc.) so as to minimize interference with the systems own communication. Further, considerably more power and power gain is available from a transistorized frequency multiplier (e.g. multiplier using a varactor) than is available from a transistorized amplifier/modulator. Finally, I have determined that it is highly preferable to envelope modulate in the last stage before power amplification and transmission since the system of the present invention is non-linear throughout and envelope modulation earlier in the system could undesirably reinsert unwanted sideband frequencies and result in reduced reproduction fidelity.

Figure 3:
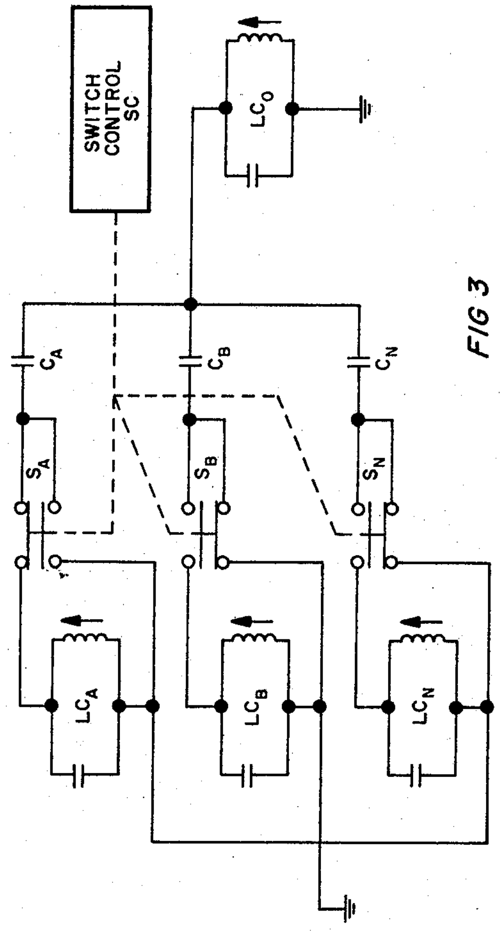

*Detailed description—FIGURE 3*

FIGURE 3 sets forth an AC equivalent circuit of a substantially lossless summation network which graphically includes the tuned circuits of Carrier generators 10, 12 . . . 14, the Diode Switch modulators 16, 18 . . . 20 and the coupling capacitors conventionally used to couple the AC signals to the summation network 24.

It is well known in the prior art that considerable power is lost in algebraic summation network which utilize pure resistive isolation elements between the sources to be summed and the network. In any double-tuned circuit comprising an input tuned circuit $L_1C_1$, a coupling capacitor $C_c$ and an output tuned circuit $L_2C_2$, power can be efficiently transferred from input to output, i.e., minimum power loss between input and output, provided the Q of each coil $L_1$ and $L_2$ can be maintained at a reasonable level. In most resistive summing networks the power loss generally exceeds 10 db. This degree of power loss is highly undesirable. It is necessary that power losses in the summation network of this invention be kept to a minimum and preferably lossless. Low power loss capability was uniquely achieved in the present invention by providing high speed isolation of each parallel connected input tuned circuit and minimize unwanted loading effects which directly cause power losses.

In the AC equivalent circuit of FIG. 3, the input tuned circuit $LC_A$, $LC_B$. . . $LC_N$ respectively represent the Carrier Generators 10, 12 . . . 14 and the output tuned circuit $LC_O$ represents the Summation Network 24. The input tuned circuits $LC_A$, $LC_B$ . . . $LC_N$ are coupled to the output circuit $LC_O$ via double pole single throw switches $S_A$, $S_B$ . . . $S_N$, respectively, and coupling capacitors $C_A$, $C_B$ . . . $C_N$, respectively. Switches $S_A$, $S_B$ . . . $S_N$ are independently controlled by Switch Control SC. By using the switching configuration shown in FIG. 3 (e.g. diodes may perform the DPST switch function), a plurality of input tuned circuits may be connected in parallel and appropriately isolated by the switches $S_A$, $S_B$ . . . $S_N$ so as to prevent unwanted loading of the output tuned circuit $LC_O$ when a signal is coupled from one of the input tuned circuits but not the others.

By way of explanation, assume switch $S_A$ is energized so that the input tuned circuit $LC_A$ is connected to output tuned circuit $LC_O$, and switches $S_B$ . . . $S_N$ are de-energized so that coupling capacitors $C_B$ . . . $C_N$ are each connected to ground. Thus, the input tuned circuit comprises $LC_A$ plus $C_A$ whereas the output tuned circuit comprises $LC_O$ plus $C_B$ . . . $C_N$ (where the total capacitance equals $C_O$ plus $C_B$ . . . $C_N$ all in parallel). By shorting the capacitors $C_B$ . . . $C_N$ to ground they become part of the output tuned circuit and consequently completely isolate the input tuned circuits $LC_B$ . . . $LC_N$ from the output tuned circuit $LC_O$. A similar analysis can be made when one of the switches $LC_B$ . . . $LC_N$ is energized and the remaining switches de-energized. In the most common application, coupling capacitors $C_A$, $C_B$ . . . $C_N$ are equal but it is to be understood that if variable output tuning or selectivity is required for each switching operation, the sizes of coupling capacitors $C_A$, $C_B$ . . . $C_N$ may be independently varied without departing from the spirit and scope of the present invention.

The switches $S_A$, $S_B$ . . . $S_N$ are independently controlled by switch control SC which may be electro-magnetic or electronic. It will be apparent however that several techniques may be utilized to provide the switching operation, although high speed diode switches controlled by gating pulses are preferable. One preferred embodiment of a diode switch modulator is set forth below with regard to the detail description of the FIG. 4 circuit.

Figure 4A:
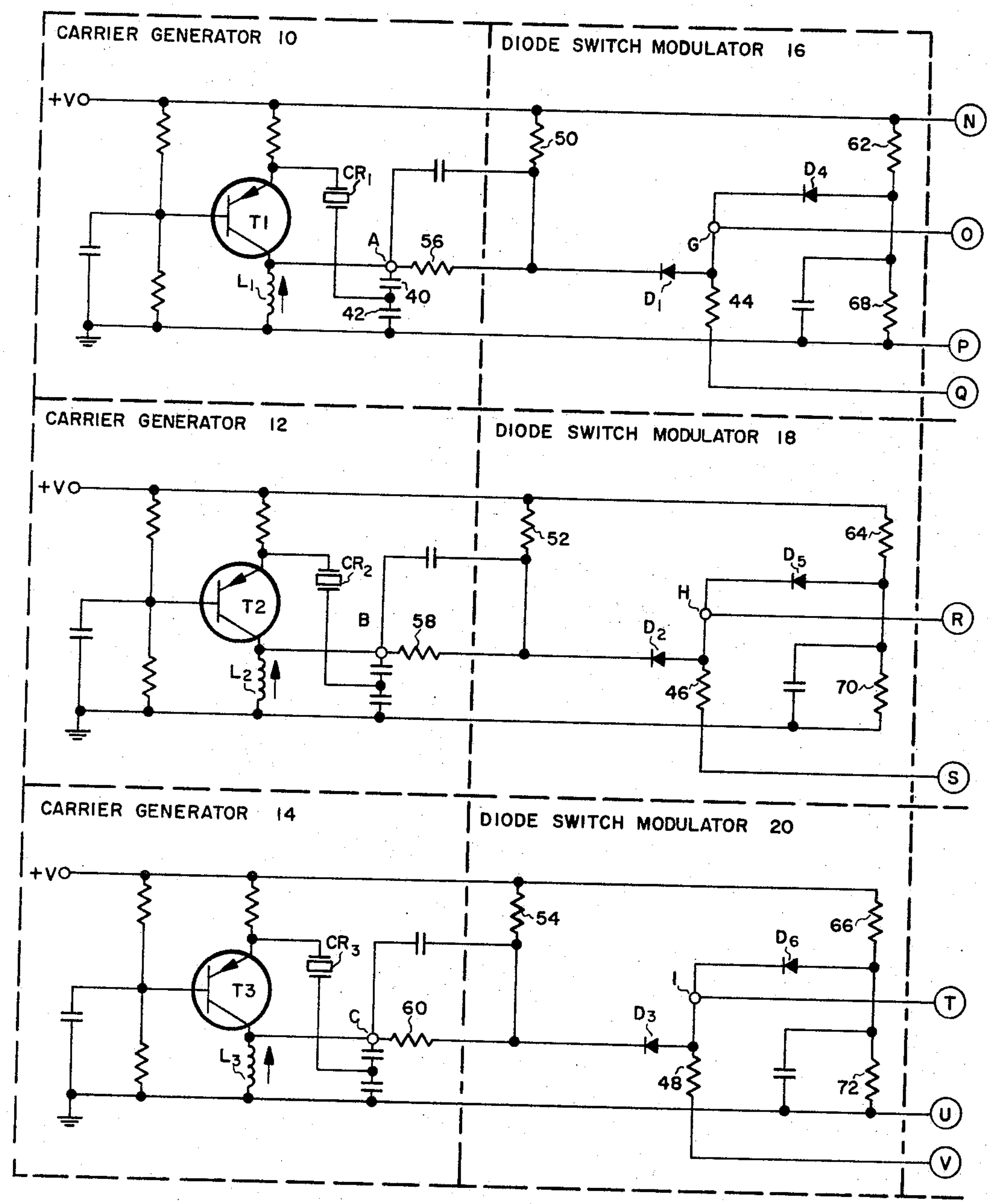
Figure 4B:
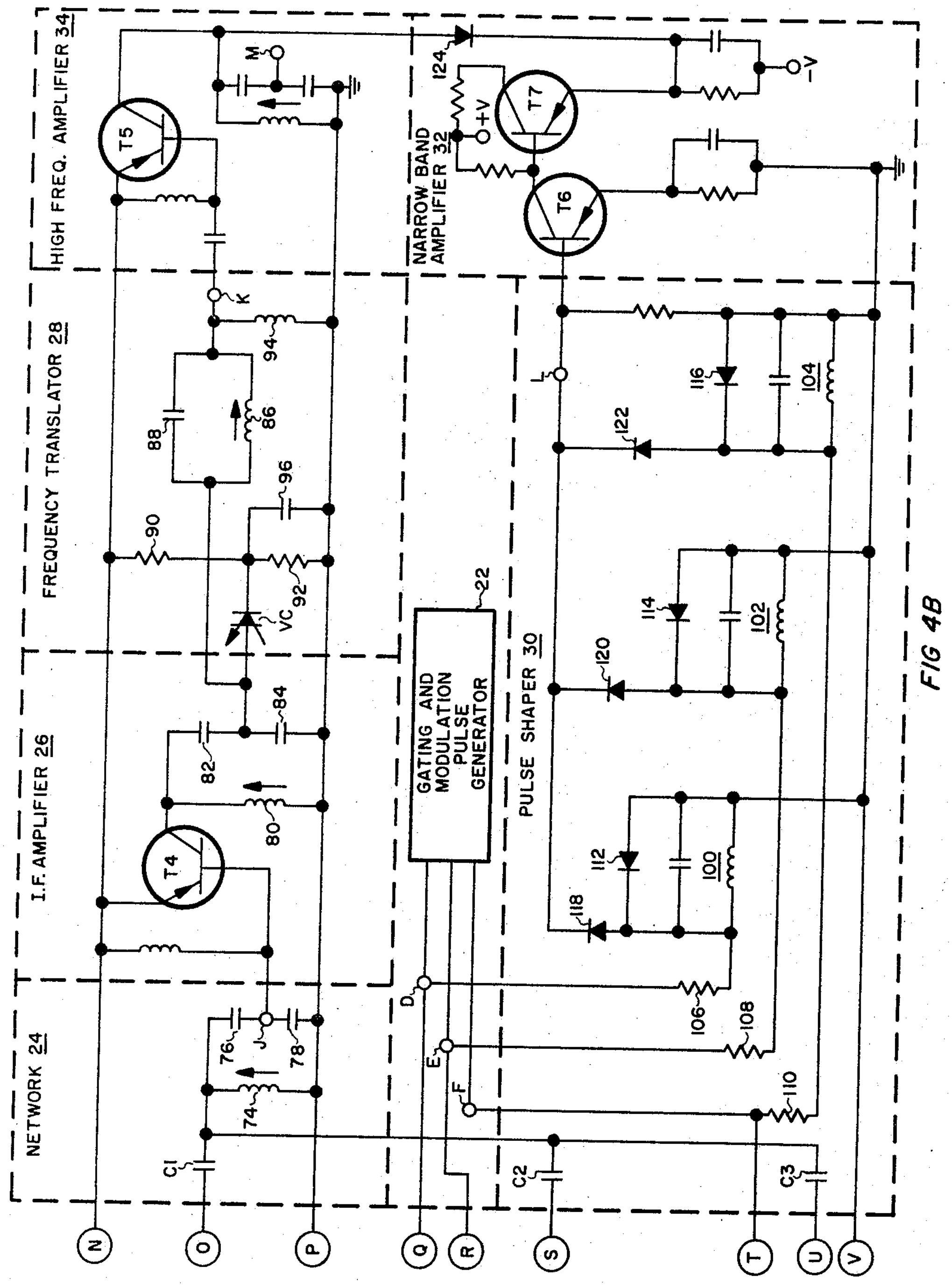

*Detailed description—FIGURES 4A–4B*

FIGURES 4A–4B depict a detailed circuit of the preferred embodiment of the present invention as exemplified by the block diagram of FIG. 1. This figure includes a plurality of dotted lines which form a plurality of dotted squares and rectangles each of which correspond to the blocks of FIG. 1 and are correspondingly labeled. The Gating and Modulation Pulse Generator is not shown in detailed circuitry since an unlimited number of pulse code sources may be utilized, and a selection of one of such sources is not considered necessary for the purpose of disclosing the novel and unique aspects of the present invention. In addition, the waveforms shown in FIGURE 2 are respectively present on terminals A to M of FIGS. 4A–4B.

Carrier Generators 10, 12 . . . 14 respectively include transistors $T_1$, $T_2$ . . . $T_3$, crystals $CR_1$, $CR_2$ . . . $CR_3$ in the emitter circuits of transistors $T_1$, $T_2$ . . . $T_3$ and variable inductors $L_1$, $L_2$ . . . $L_3$ in the collector circuits of transistors $T_1$, $T_2$ . . . $T_3$.

The carrier generators 10, 12 . . . 14 are each modified Colpitts oscillators with the crystal $CR_1$, $CR_2$ . . . $CR_3$ used in a series mode in the in-phase loop. Although this oscillator configuration is basically known in the prior art for frequencies below 20 megacycles certain characteristics of this oscillator with slightly modified circuit parameters produce markedly different results at frequencies exceeding 70 megacycles.

The prior art clearly dictates the usage of a fifth overtone crystal in oscillators. This type of oscillator usually results in reduced crystal activity because of their use of the crystal at such high order harmonics. Special parameters must be considered in the design of the conventional feedback loop of such fifth harmonic crystal oscillators. It is a general practice in the design of high harmonic crystal oscillators that the tuning element (e.g. inductors $L_1$, $L_2$ . . . $L_3$) or frequency determining element be effectively isolated from the active element (e.g. Transistors $T_1$, $T_2$ . . . $T_3$) at all times so that dynamic circuit variations due to time, environment and tolerance produce very low changes in the resonant point of operation. The prior art also teaches that "off resonance" operation produced by inductive or capacitive de-tuning is permissible since the rate of change of either the inductance or capacitance of the oscillator with respect to frequency is very rapid near resonance.

The specific fifth overtone oscillator utilized in the circuit of FIGS. 4A–4B violates both of the foregoing well known concepts. The inductive or capactive mode of the circuit is not practical in the fifth overtone, high frequency, crystal controlled oscillator of the present invention. Thus, the physical shunt capacity of the crystal and its holder must therefore be smaller in reactive impedance than that which is usable in the "off resonance" mode of operation. While this arrangement will certainly sustain oscillation, the crystal will in no way control the oscillator frequency. Therefore, the in-phase series mode of operation is generally the only usable configuration of a fifth overtone oscillator. Even in this in-phase series configuration with low crystal activity the relatively high series resistance of the crystal is only slightly below the crystal shunt capacitive reactance. Conventional techniques for providing frequency control of overtone oscillators involve the use of a peaking coil connected across the crystal. This technique however undesirably results in spurious responses due to the fact that the peaking coil will resonate with other circuit capacities at a frequency other than the resonant frequency of the overtone oscillator.

The overtone oscillators, i.e., carrier generators 10, 12 . . . 14, of the present invention uniquely overcome the foregoing disadvantages regarding prior known overtone oscillators by utilizing a uniquely different and reasonably critical arrangement of the feedback transformation of the overtone oscillator. This is accomplished by connecting, for example, the crystal $CR_1$ of carrier generator 10 between the emitter of transistor $T_1$ and the junction of capacitors 40 and 42 with its other end respectively connected to the collector of transistor $T_1$ and ground, and by connecting the variable inductor between the collector of transistor $T_1$ and ground. Similar circuit arrangements are provided in carrier generators 12 . . . 14. Thus, considerably more signal is returned back to an "in-phase" position in the input circuit of the generators. Unexpectedly, the actual signal fed back is that which is normally common for a feedback amplifier rather than that common to conventional overtone oscillators. By utilizing the foregoing modified fifth overtone oscillator as generators 10, 12 . . . 14, excellent interchangeability, simple and positive alignment, and excellent starting characteristics are attained. Uniquely enough, however, the modified feedback configuration above described performs equally well with third overtone crystals without further modification.

The outputs of carrier generators 10, 12 . . . 14 are taken from terminals A, B . . . C and respectively coupled to the cathode of diodes $D_1$, $D_2$ . . . $D_3$ of the Diode Switch Modulators 16, 18 . . . 20. Diode Switch Modulators 16, 18 . . . 20 are alternately gated by narrow gating and modulation pulses. These pulses are provided or generated by the gating and modulation pulse generator 22 and respectively coupled to anodes of diodes $D_1$, $D_2$ . . . $D_3$ via terminals D, E . . . F, respectively, and resistors 44, 46 . . . 48, respectively. The gating and modulation pulses may, for example, have a two microsecond "on" period.

Diodes $D_4$, $D_5$ . . . $D_6$ are included so as to provide a double diode switch configuration. This in effect enables the two diodes in each Diode Switch Modulator to function as a double throw single pole switch. Each of the diodes $D_1$, $D_2$ . . . $D_3$ in the Diode Switch Modulators 16, 18 . . . 20 are reversely biased in the absence of a gating and modulation pulse from Generator 22. The resistors 50, 52 . . . 54 respectively in combination with resistors 56, 58 . . . 60, form voltage dividers which respectively reverse bias diodes $D_1$, $D_2$ . . . $D_3$, whereas the resistors 62, 64 . . . 66 respectively in combination with resistors 68, 70 . . . 72 form voltage dividers which respectively forward bias diodes $D_4$, $D_5$ . . . $D_6$. Thus, when no gating and modulation pulses are coupled to the anodes of diodes $D_1$, $D_2$ . . . $D_3$, the Carrier Generators 10, 12 . . . 14 are completely isolated from the Summation Network 24 while the coupling capacitors $C_1$, $C_2$ . . . $C_3$ are shorted to ground through conducting diodes $D_4$, $D_5$ . . . $D_6$, respectively, and resistors 68, 70 . . . 72, respectively. However, when a gating and modulation pulse is coupled to any one of the anodes of diodes $D_1$, $D_2$ . . . $D_3$, such diode is forward biased and its corresponding diode $D_4$, $D_5$ . . . $D_6$ is reverse biased. This disconnects from ground the corresponding capacitor $C_1$, $C_2$ . . . or $C_3$ and permits the frequency generated by the corresponding Carrier Generator 10, 12 . . . or 14 to "feed through" the corresponding diode $D_1$, $D_2$ . . . or $D_3$ and through the corresponding capacitor $C_1$, $C_2$ . . . $C_3$ to the Summation Network 24.

It has been determined that by operating at very low impedance levels with double diode switching forty db signal "on" versus signal "off" ratios were attainable. This is a significant and unexpected improvement over prior known diode switches.

For exemplary purposes only, the gating and modulation pulses may be equal to or greater than five volts with minimal rise time requirements. Note here that resistors 50, 52 . . . 54 also provide continuous loading of the crystal controlled carrier generators 10, 12 . . . 14 so as to advantageously minimize unwanted AM and FM modulation during diode gating. Note also that since the coupling capacitors $C_1$, $C_2$ . . . $C_3$ are shunted to ground when no gating and modulation pulse is coupled to their corresponding Diode Switch Modulator 16, 18 . . . or 20, they become part of the tuned circuit of the Summation Network 24 and completely isolate their corresponding tuned circuits of the Carrier Generators 10, 12 . . . 14. This uniquely results in substantially no power losses in the Summation Network 24.

Summation Network 24 includes variable inductor 74 which has one end connected to ground and the other end connected to the junction of coupling capacitors $C_1$, $C_2$ . . . $C_3$, and two series capacitors 76 and 78 connected between ground and the common junction of couppling capacitors $C_1$, $C_2$ . . . $C_3$. The outputs of Diode Switch Modulators 16, 18 . . . 20 are coupled from terminals G, H . . . I, respectively, to the Network via coupling capacitors $C_1$, $C_2$ . . . $C_3$, respectively. The output of Summation Network 24 is taken at terminal J and coupled to a transistorized I.F. Amplifier 26.

I.F. Amplifier 26 includes a transistor $T_4$ having an inductor 80 coupled between ground and its collector and a pair of series connected capacitors 82 and 84 also coupled between ground and its collector. IF Amplifier 26 is preferably a class "B" amplifier stage and is primarily utilized to raise the power to a sufficient level to drive the Frequency Translator 28 efficiently. Additionally, this IF amplifier stage advantageously reduces CW feedthrough by approximately 20 db, and provides peak limiting so as to improve manufacturing repeatability.

Frequency Translator 28 includes a parallel LC circuit 86–88 connected between the junction of capacitors 82–84 and the output terminal K, a varactor VC coupled between the junction of capacitors 82 and 84 and the junction of voltage divider resistors 90–92, inductor 94 coupled between terminal K and ground, and a capacitor 96 coupled between the junction of voltage divider resistors 90–92 and ground.

Fundamental power is applied to varactor diode VC from a low impedance drive point (junction of capacitors 82 and 84) of the tuned circuit in the collector circuit of transistor $T_4$, whereas the DC bias for the VC is applied through the voltage divider network 90–92. The tuned circuit 86–88 constitutes a fundamental frequency trap and inductor 86 is tuned so as to prevent impedance loading of the varactor VC at its fundamental frequency. The variable inductor 94 is tuned to resonate with the varactor capacity at a harmonic of the fundamental frequency, or as preferred herein at the second harmonic. The foregoing frequency translator 28 has minimum components yet possesses relatively high efficiency in the order of seventy percent or greater, and since it is inherently nonlinear for low level signals it further reduces CW feedthrough by approximately 20 db.

High Frequency Amplifier 34 is identical in all respects to the IF Amplifier 26 except that it is tuned to operate at a frequency equal to the frequency of the I.F. Amplifier 26 times the multiplication factor of the frequency translator 28. In the embodiment of FIG. 4, the High Frequency Amplifier 34 is tuned to 140–142 megacycles and since it is also a class B amplifier stage, it provides an additional 20 db reduction of CW feedthrough.

Briefly restating, in pulse code communication systems of the type described relatively wide spectral distribution of radiated power is required, primarily due to and dependent upon the rise time and duty cycle of the gating and modulation pulses 17, 19 . . . 21. The heretofore conventional technique of utilizing final passive filtration to control the radiation spectrum to useful and permissible energies is somewhat difficult to achieve in systems of this type where the harmonics of one gating and modulation pulse lie within the spectral domain of other gating and modulation pulses. The unique pulse shaping and envelope modulation technique of the present invention achieves control of the transmitting frequency spectrum without final passive filtration and requires considerably fewer components, provides minimum power loss, and additionally provides 20 db of CW feedthrough rejection. Pulse shaping and envelope modulation is provided in accordance with the present invention as follows:

The gating and modulation pulses 17, 19 . . . 21 are coupled to the pulse shaper 30, which includes a plurality of tuned circuits 100, 102 . . . 104, via terminals D, E . . . F and resistors 106, 108 . . . 110. The pulses 17, 19 . . . 21 respectively shock excite the tuned circuits 100, 102 . . . 104 causes them to independently ring. However, diodes 112, 114 . . . 116 respectively permit the tune circuits 100, 102 . . . 104 to ring for only one-half cycle whereupon the tuned circuits are respectively discharged by their corresponding diode.

Tuned circuits 100, 102 . . . 104 are specifically designed so as to produce a positive pulse having a bandwidth relatively narrower than the bandwidth of the gating and modulation pulses 17, 19 . . . 21. Diodes 118, 120 . . . 122 are provided for passing the narrow band, positive pulse yet block any negative excursions which may be generated by the tuned circuits 112, 114 . . . 116. Also, diodes 118, 120 . . . 122 isolate each tuned circuit from each other and prevent the positive pulses generated by one tuned circuit from shock exciting any other tuned circuit.

The output of the pulse shaper is taken from the cathode of diodes 118, 120 . . . 122 via terminal J and coupled to the two transistor stage, gain stabilized, narrow band amplifier 32. Narrow Band Amplifier 32 is conventional in design. The output of the Narrow Band Amplifier 32 is taken from the collector of the last transistor stage $T_7$ and coupled through a modulating diode 124 to the output tuned circuit of High Frequency Amplifier 34, and is utilized to envelope modulate the pulse modulated high frequencies present in the output circuit of the High Frequency Amplifier 34.

It will be seen from the foregoing the the narrow band pulses used to envelope modulate the pulse modulated high frequencies uniquely achieve selective filtering of unwanted side band frequencies of any one of the transmitting frequencies which may be present within the spectral domain of any other transmitting frequency, and do this without utilizing complex passive filtration techniques. Thus, the narrow band envelope modulation technique of the present invention advantageously provides selective restriction of the RF spectrum of the radiated pulse modulated high frequency carriers.

Note here that the several tuned circuits of the present invention are coupled to adjacent stages by capacitive divider networks and each utilizes a variable inductor as the tuning element. This circuit arrangement provides ideal impedance matching between stages, and increases repeatability of performance since there is a minimum of interaction between the tuning and impedance matching properties of these tuned circuits.

It will be apparent therefore that the pulse modulated RF exciter of the present invention advantageously provides dependable third and fifth overtone, high frequency, crystal controlled, oscillator operation due to the unique arrangement of the feedback transformation which permits considerably more signal from the output circuit to be fed back to an "in-phase" position in the input circuit. Further, the use of the double diode switching feature reduces power losses in the Summation Network to substantially zero by shorting to ground the coupling capacitors which feed the Summation Network during "off" gating periods.

While a specific embodiment of the present invention has been shown and described in both basic block diagram form and detailed circuitry form, it will, of course, be understood that other modifications are clearly contemplated which would be apparent to persons skilled in the art without departing from the spirit of the present invention or the scope of the appended claims.

I claim:

1. A modulator for use in a multi-channel transmitter of pulse modulated high frequencies comprising, in combination:

(a) modulating means for independently modulating a plurality of frequencies with information pulses;

(b) summing means coupled to said modulating means for summing said plurality of pulse modulated frequencies;

(c) shaping means for providing relatively narrow bandwidth pulses which are positioned in time to correspond with said information pulses; and (d) mixing means coupled to said summing means and to said shaping means for envelope modulating said high frequencies with said narrow bandwith pulses so as to prevent any harmonics of any one of said high frequencies from overlapping the frequency spectrum of any other of said high frequencies, whereby the frequency spectrum of each said high frequencies is selectively restricted.

2. A modulator in accordance with claim 1, wherein said modulating means includes:

(a) a plurality of diode switch modulators, each having two inputs and one output;
(b) a plurality of frequency generators for generating said plurality of frequencies, each frequency being respectively coupled to one input of said modulators; and
(c) a pulse generator for generating a plurality of information pulses each pulse being respectively coupled to the other input of said modulators, whereby each of said plurality of frequencies are respectively modulated by said information pulses.

3. A modulator in accordance with claim 2, wherein:
(a) said outputs of said diode switch modulators are coupled to said summing means.

4. A modulator in accordance with claim 1, wherein:
(a) said shaping means includes a plurality of pulse shapers, each respectively coupled to receive said information pulses, said shapers being adapted to convert said information pulses into pulses having a bandwidth relatively narrower than the bandwidth of said information pulses.

5. An RF modulator for use in a multichannel transmitter of pulse modulated carrier frequencies comprising, in combination:
(a) modulating means for independently modulating a plurality of IF carriers with rectangular pulse information;
(b) summing means coupled to said modulating means for summing said plurality of pulse modulated IF carriers;
(c) translating means coupled to said summing means for translating said amplified IF carriers into RF carriers for direct antenna radiation;
(d) shaping means for shaping each of said rectangular pulses into a pulse having a bandwidth relatively narrower than the bandwidth of said rectangular pulses and positioned in time to correspond with said rectangular pulses; and
(e) mixing means coupled to said translating means and to said shaping means for envelope modulating said RF carriers with said narrow bandwidth pulses so as to prevent any harmonics of any one of said RF carriers from overlapping the frequency spectrum of any other of said RF carriers, whereby the RF spectral radiation of said RF carriers is selectively restricted.

6. An RF modulator for use in a multichannel transmitter of pulse modulated RF carriers comprising, in combination:
(a) a plurality of frequency generators for generating a plurality of IF carriers;
(b) a pulse generator having a plurality of outputs for providing a plurality of time positioned information pulses;
(c) a plurality of diode switch modulators respectively coupled to said frequency generators and to said outputs of said pulse generator for respectively modulating said IF carriers with said information pulses;
(d) a summation network coupled to each of said diode switch modulators for algebraically summing said pulse modulated IF carriers;
(e) a frequency translator coupled to said summation network for translating said summed pulse modulated IF carriers into RF carriers for direct antenna radiation;
(f) a pulse shaper coupled to said outputs of said pulse generator for shaping said information pulses into pulses having a bandwidth considerably narrower than the bandwidth of said information pulses; and
(g) an RF amplifier having two inputs and being coupled to said frequency translator and to said pulse shaper for envelope modulating said RF carriers with said narrow bandwidth pulses so as to prevent any harmonics of any one of said RF carriers from overlapping the frequency spectrum of any other of said RF carriers, whereby the RF spectrum of each of said RF carriers is selectively restricted.

7. An RF modulator in accordance with claim 6, wherein each of said plurality of frequency generators includes:
(a) a transistor having input, output and control circuits;
(b) a tuned circuit having a predetermined resonant frequency including a center-tapped capacitive voltage divider connected in parallel arrangement with a variable inductor, said tuned circuit being connected between said output circuit and ground; and
(c) a crystal connected between said input circuit and said center-tap, whereby maximum in-phase feedback is provided from said tuned circuit to said input circuit thereby stabilizing the oscillation of said oscillator at the resonant frequency of said tuned circuit.

8. An RF modulator in accordance with claim 7, wherein:
(a) said resonant frequency of said tuned circuit is the fifth harmonic of said crystal.

9. An RF modulator in accordance with claim 6, wherein said diode switch modulators each include:
(a) first and second diodes each having a cathode and anode, said cathode of said first diode being connected to its respective frequency generator, said anode of said first diode being connected to said cathode of said second diode and said anode of said secon diode being connected to ground;
(b) a coupling capacitor connected between the junction of said first and second diodes and said summation network;
(c) biasing means for reverse biasing said first diode so as to block said IF carriers from passing to said summation network, and for biasing said second diode so as to short said coupling capacitor and prevent said diode switch modulator from loading said summation network; and
(d) said information pulses being respectively coupled to the junction of said first and second diodes so as to cause said first and second diodes to be forward and reverse biased, respectively, thereby disconnecting said coupling capacitors and permitting said RF carriers to pass to said summation network during the time interval of said information pulses.

10. An RF modulator in accordance with claim 9, wherein:
(a) said information pulses are time spaced with respect to each other so that only one information pulse is present on said outputs of said pulse generator during any finite interval of time, whereby only one of said IF carriers is coupled to said summation network during any finite interval of time.

11. An RF modulator in accordance with claim 6, wherein said summation network includes:
(a) a center-tapped capacitive voltage divider connected in parallel to a variable inductor, and
(b) the output of said summation network is taken from said center-tap of said capacitive voltage divider and coupled to said frequency translator.

12. An RF modulator in accordance with claim 6 wherein said frequency translator includes:
(a) a tuned circuit having a capacitor in parallel to a variable inductor, said tuned circuit being series connected between said summation network and said RF amplifier; and
(b) a varactor being in parallel circuit relationship with respect to said tuned circuit, and being connected between said summation network and ground.

13. An RF modulator in accordance with claim 6, wherein said pulse shaper includes:
(a) a plurality of parallel LC circuits each having its input respectively connected to said outputs of said pulse generator; and each having its output connected in common to said RF amplifier through respective diodes;

(b) said information pulses of said pulse generator being sufficient to shock excite said LC circuits causing said LC circuit to oscillate; and (c) said diodes being biased so as to pass only the first half cycle of said LC circuits oscillations and to discharge said LC circuits during the second half cycle of said LC circuits oscillations, whereby said pulse shaper provides a plurality of pulses respectively corresponding in time to said information pulses and having a bandwidth relatively narrower than the bandwidth of said information pulses.

14. An RF modulator in accordance with claim 6 further including:

(a) a non-linear IF amplifier connected between said summation network and said frequency translator for power amplification of said summed pulse modulated intermediate RF frequencies;

(b) a non-linear narrow-band pulse amplifier connected between said pulse shaper and said RF frequency modulator for power amplification of said narrow bandwidth pulse; and (c) said frequency translator, pulse shaper and RF amplifier being non-linear, whereby said modulator has substantially non-linear characteristics so as to provide relatively high CW feed through rejection.

15. A method of selectively restricting the RF spectral radiation of a plurality of high frequencies comprising the steps of:

(a) independently modulating a plurality of carrier frequencies with pulse information;

(b) summing said plurality of pulse modulated carrier frequencies;

(c) translating said summed carrier frequencies into high carrier frequencies;

(d) developing a plurality of narrow bandwidth pulses which are positioned in time to correspond to said pulse information; and (e) mixing said narrow bandwidth pulses and said pulse modulated high carrier frequencies so that said narrow bandwidth pulses envelope modulate said pulse modulated high carrier frequencies so as to prevent the harmonics of any one of said plurality of high frequencies from overlapping the frequency spectrum of any other of said plurality of high frequencies, whereby the RF spectral radiation of said high carrier frequencies is selectively restricted.

No references cited.

JOHN W. CALDWELL, *Acting Primary Examiner.*

ROBERT L. GRIFFIN, *Examiner.*